(12) United States Patent
Sluiman (10) Patent No.: US 7,133,871 B2
(45) Date of Patent: Nov. 7, 2006

(54) SCHEMA FOR SHARING RELATIONAL DATABASE TYPES

(75) Inventor: Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 09/998,704

(22) Filed: Nov. 30, 2001

(65) Prior Publication Data
US 2003/0028511 A1 Feb. 6, 2003

(30) Foreign Application Priority Data
Jul. 31, 2001 (CA) .................................. 2354437

(51) Int. Cl.
*G06F 17/30* (2006.01)
(52) U.S. Cl. ..................... 707/10; 707/103 R
(58) Field of Classification Search .................. 707/10, 707/100, 102, 103 RZ, 101, 703 R–703 Z
See application file for complete search history.

(56) References Cited

U.S. PATENT DOCUMENTS 6,282,547 B1* 8/2001 Hirsch ........................ 707/102
6,662,188 B1* 12/2003 Rasmussen et al. ........ 707/102
2002/0023261 A1* 2/2002 Goodwin et al. ........... 717/146
2002/0169745 A1* 11/2002 Hotti et al. ..................... 707/1

OTHER PUBLICATIONS

Bergamaschi, S.; Garuti, A.; Sartori, C.; Venuta, A.; "Object Wrapper: an object-oriented interface for relational database", EUROMICRO 97. 'New Frontiers of Information Technology'., Proceedings of the 23rd EUROMICRO Conference Sep. 1-4, 1997 pp. 41-46.*
"XML Metadata Interchange (XMI)"; http://www.oasis-open.org/cover/xmi.html.*

* cited by examiner

Primary Examiner—John Cottingham
Assistant Examiner—Miranda Le
(74) Attorney, Agent, or Firm—John L. Rogitz (57) ABSTRACT

A schema for storing the meta data that describes relational databases. Advantageously, the schema can be used in both database vendor environments and toolkit vendor environments, thereby facilitating the sharing of relational database types. In addition, by describing the schema in a standard modeling language, even among multiple implementations of storage systems designed according to the schema, the conceptual structure and understanding of each storage system can be the same.

12 Claims, 10 Drawing Sheets

SCHEMA FOR SHARING RELATIONAL DATABASE TYPES

RELATED APPLICATIONS

The present application claims priority from Canadian patent application serial no. 2,354,437, filed Jul. 31, 2001.

1. Field of the Invention

The present invention relates to relational databases and, in particular, a schema for sharing relational database types and methods and apparatus for employing the schema.

2. Background of the Invention

Data collection is ever increasing in a world wherein more and more transactions occur electronically. Indeed, certain applications, such as data mining, that are made more useful by the combination of increasing processor power and increasing availability of data, tend to inspire further data collection. This inspiration to further data collection may be seen, for instance, in the proliferation of customer reward programs. In response to this increasing availability of data, industries have been built up over recent decades around database technology. Specifically, active members of these industries include database vendors, who sell databases either individually or collectively (e.g., in a database catalog), and tool vendors, who sell software that may be used to create a new database or alter existing databases.

Relational Databases can be thought of as comprising Tables having Rows and Columns. Unfortunately, while programming practices have largely graduated from procedural techniques to object-oriented techniques, databases have not moved nearly as quickly toward object-oriented design. Hence, there is often a need for a bridge between relational databases and the object-oriented programs for exploiting the data within relational databases. The design of a given database is described by information known as "meta data". Today, database vendors each have their own unique schema used to store meta data about each of the database types contained in a given catalog. A catalog is a database containing information about databases stored on a particular server, a group of servers, or all the servers in a domain. In addition, vendors of tools for working with databases generally provide a proprietary data store for storing a tool's understanding of a given set of meta data.

Structured Query Language (SQL) is a standard interactive and programming language for getting information from, writing information to and updating a database. SQL defines a language known as Data Definition Language (DDL) that can be used like a set of commands to create or edit meta data in a database catalog. For further information about SQL, see "ISO Final Draft International Standard (FDIS)—Database Language SQL—Part 2: Foundation (SQL/Foundation)", March 99, which is incorporated herein by reference and referenced hereinafter as "the SQL specification".

Consider a user employing a tool vendor's product (a tool) to edit a catalog of databases from a database vendor. The result of the use of the tool to edit the catalog is a new catalog, formed according to rules that govern the operation of the tool. The user issues commands in DDL to alter the meta data in the catalog, where the meta data is stored using a schema unique to the database vendor. The tool has to parse these commands and examine the catalog to attempt to understand the meta data, before saving an understanding of the meta data in the new catalog. In general this parsing leads to some data loss between meta data stores. Which is to say that the meta data in the new catalog is stored using a schema proprietary to the tool vendor. The schema is likely different from the schema used by the database vendor.

As soon as database or tool vendors wish to share meta data, the vendors run into this data loss problem. In general, to have complete support, bridges are built between a pair of vendors to translate the meta data. These bridges are maintenance-intensive and very vendor-pair specific. One alternative is to use a "lowest common denominator" approach, wherein only the data classifications that the two vendors share in common may be translated. Although not as maintenance-intensive, this approach is very vendor-pair specific and data loss is typically an even greater problem.

SUMMARY OF THE INVENTION

A schema is described for storing the meta data that describes relational databases. Advantageously, the schema can be used in both database vendor environments and toolkit vendor environments, thereby facilitating the sharing of relational database types. In addition, by describing the schema in a standard modeling language, even among multiple implementations of storage systems designed according to the schema, the conceptual structure and understanding of each storage system can be the same. In a preferred embodiment, the schema is implemented using the Unified Modeling Language (UML).

In accordance with an aspect of the present invention there is provided a schema for storing meta data that describes a relational database. The schema includes an abstract class for defining a data type of a member. The abstract class includes a property for indicating a generic Structured Query Language data type for the member, a property for indicating a database-specific data type name for the member and a method for constructing an object instantiated from a class derived from the abstract class.

In accordance with another aspect of the present invention there is provided a storage system in a database catalog. The storage system includes an object of a class derived from an abstract class for defining a data type of a member. The abstract class includes a property for indicating a generic Structured Query Language data type for the member, a property for indicating a database-specific data type name for the member and a method for constructing an object instantiated from a class derived from the abstract class.

In accordance with a further aspect of the present invention there is provided an object-oriented description of a relational database. The object-oriented description includes an object for describing a type of a member in the relational database, the object instantiated from a class derived from an abstract class for defining a data type of a member, the abstract class includes a property for indicating a generic Structured Query Language data type for the member, a property for indicating a database-specific data type name for the member, a method for constructing an object instantiated from a class derived from the abstract class. In a further aspect of the present invention, there is provided a software medium that contains the object-oriented description.

In accordance with a still further aspect of the present invention there is provided a schema for storing meta data that describes a relational database. The schema includes an abstract class for naming groups of members in the relational database, where the abstract class has a property for naming the group of the members.

In accordance with an even further aspect of the present invention there is provided an object-oriented description of a relational database. The object-oriented description includes an object for referencing a group of members in the relational database, the object instantiated from a class derived from an abstract class for naming groups of members in the relational database, the abstract class having a property for naming the groups of the members. In a further aspect of the present invention, there is provided a software medium that contains the object-oriented description.

In accordance with still another aspect of the present invention there is provided a method of facilitating sharing of relational database types. The method includes transforming a first representation of database meta data into a second representation of the database meta data, where the second representation of the database meta data follows a given schema, and storing the first representation in a repository in the form of a set of objects of classes defined in the given schema. In another aspect of the present invention there is provided a computer system for carrying out this method.

In accordance with still another aspect of the present invention there is provided an object-oriented programming language implementation of a schema for storing meta data that describes a relational database. The implementation includes an abstract class for defining a data type of a member. The abstract class includes a property for indicating a generic Structured Query Language data type for the member, a property for indicating a database-specific data type name for the member and a method for constructing an object instantiated from a class derived from the abstract class.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF A PREFERRED EMBODIMENT

The Unified Modeling Language (UML) is a language for specifying, visualizing, constructing and documenting the artifacts of software systems, as well as for business modeling and other non-software systems. The UML represents a collection of engineering practices that have proven successful in the modeling of large and complex systems. For a comprehensive review of the UML, see www.rational.com or a textbook such as Booch, et al., "The Unified Modeling Language User Guide", Addison-Wesley, 1999 (hereby incorporated herein by reference).

In overview, a schema is provided that describes relational database types and the inter-relationship between these types. Rather than use a sequence of commands to describe a database type, this schema may be used to give a complete understanding of the database type. Accordingly, tool vendors and database vendors can exchange complete sets of meta data without information loss or translation. The schema of the present invention is provided as a UML schema in FIGS. 1–12, detailed descriptions of which follow.

Figure 1:
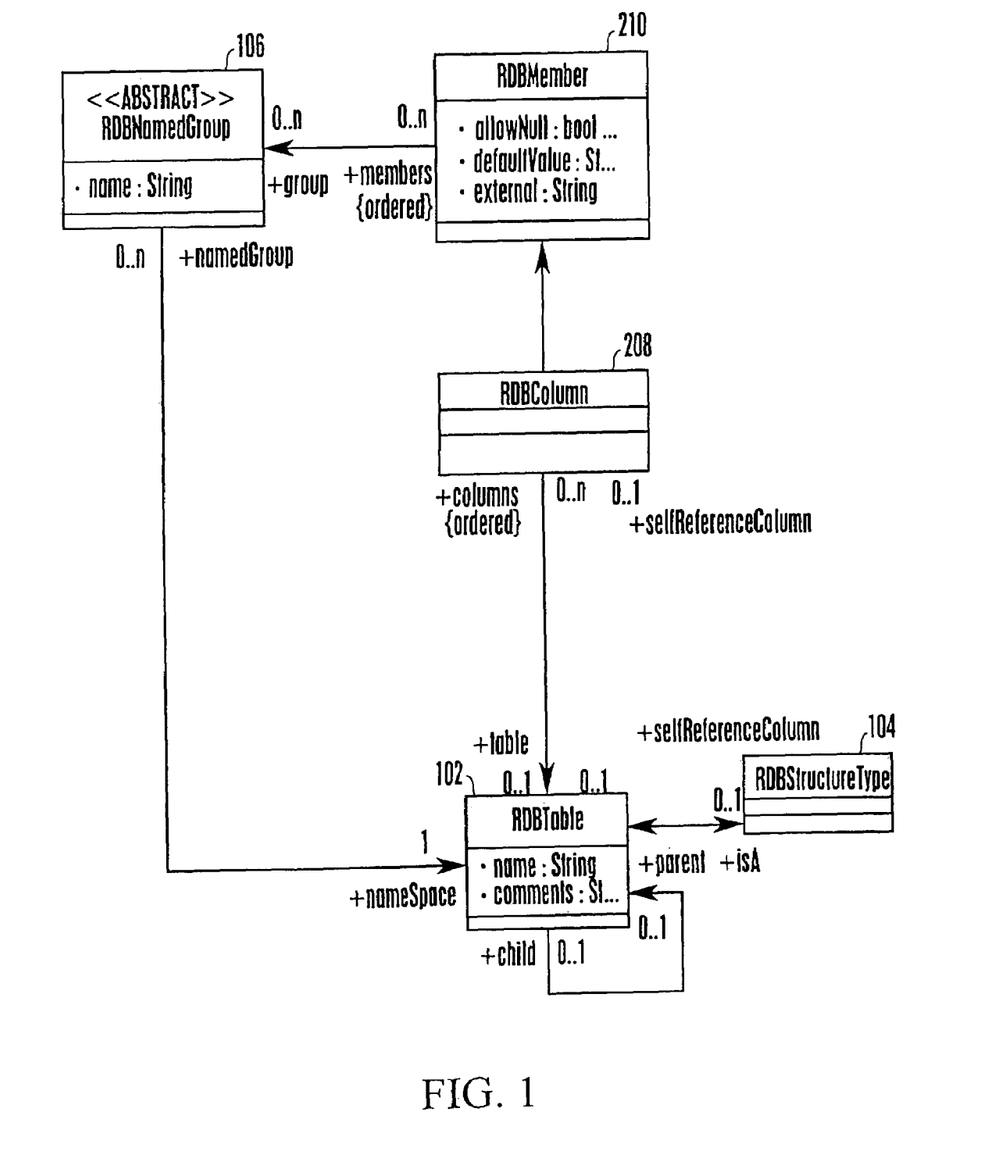
FIG. 1 illustrates a class diagram, of the UML schema that is an embodiment of the present invention, including a class RDBTable.

As shown in FIG. 1, a class RDBTable 102 references a class RDBStructuredType 104. Furthermore, child objects of class RDBTable may also reference their parent objects of class RDBTable. The class RDBTable 102, which owns an abstract class RDBNamedGroup 106 and a class RDBColumn 208, includes two properties, both of type string, called "name" and "comments". These properties may be seen as self explanatory in that an object of class RDBTable will have a name and associated comments may give a further understanding of the nature of the RDBTable object. As also shown in FIG. 1, the class RDBColumn 208 is derived from a class RDBMember 210 which is referenced by the abstract class RDBNamedGroup 106.

The class RDBTable 102 is an aggregated definition of a single Row in a Table. The class RDBTable 102 contains, by value, an optional identity, which indirectly refers to a set of members of the structure. The type of a Table, which is an object of class RDBTable, may either be defined by the structure type and reflected in a set of columns, or may be explicitly defined by the columns.

A Table may have a structure type that defines the shape of the table (i.e., a description of the set of columns the table can have), as well as an optional identity that indirectly refers to a set of members of the Table. The Table may also contain an optional set of named groups that group a set of members having a given structure type. These named groups can be used to identify the members that make up a primary key or a foreign key reference. Where a primary key is a column or combination of columns in a database table that uniquely identifies each row in the table, a foreign key reference is column or combination of columns in a database table that references the primary key of another table in the database.

If the Table is defined by a structure type (discussed hereinafter), column definitions are computed and made immutable (i.e., the column definitions cannot be modified once set). If the Table has columns and is not defined by a StructureType, a StructureType cannot be associated with the Table.

Note that member types can inherit from other member types, so a structure type can also inherit. Thus, a Table can be defined with a set of inheritance constructs. Also, user defined types can inherit from primitives, and so on.

The abstract class RDBNamedGroup 106 includes a property of type string, called "name". Simply put, an object of the abstract class RDBNamedGroup 106 allows the grouping of a set of members and the subsequent naming of the grouped set of members. The abstract class RDBNamedGroup 106 is used to define the identity of a group, the object references of a group, etc.

As may be understood through an examination of the role names (generally found at ends of the lines showing associations between classes), it may be seen that an object of the class RDBTable 102 may own multiple namedGroups that are objects instantiated from a class derived from the abstract class RDBNamedGroup 106. It may also be seen that these namedGroups are made up of members that are objects of the class RDBMember 210, that the members may be members of multiple groups and that the object of the class RDBTable 102 provides a single nameSpace from which the namedGroups take their names.

Figure 2:
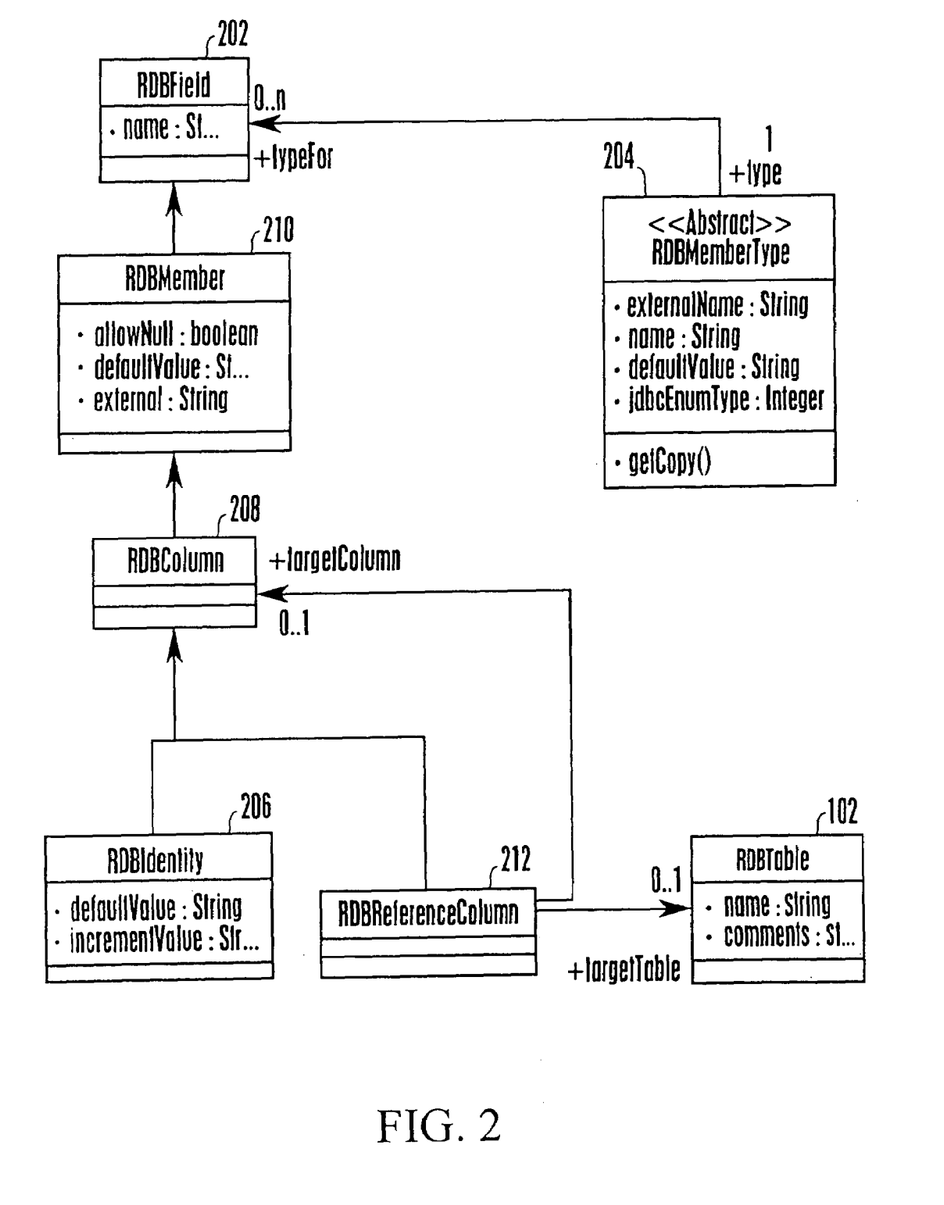
FIG. 2 illustrates a class diagram, of the UML schema that is an embodiment of the present invention, including a class RDBColumn.

As shown in FIG. 2, a class RDBField 202, which owns an abstract class RDBMemberType 204, includes a string property called "name". The class RDBMember 210 is derived from the class RDBField 202 and includes a boolean property called "allowNull" (whose initial value should be set to true) and two string properties called "defaultValue" and "external". As noted in conjunction with the description of FIG. 1, class RDBColumn is derived from the class RDBMember 210.

A class RDBIdentity 206 is derived from the class RDBColumn 208 and includes two string properties, namely "startValue" and "incrementValue". A class RDBReferenceColumn 212 is derived from the class RDBColumn 208 and also references the class RDBColumn 208 and the class RDBTable 102. Objects that are instantiations of classes such as class RDBField 202, that are owned by the abstract class RDBMemberType 204, have many properties in common. Thus, the abstract class RDBMemberType 204 includes three string properties, namely "externalName", "name" and "defaultValue", and one integer property called "jdbcEnumType". The abstract class RDBMemberType 204 also includes a method named "getCopyo".

The property "externalName" corresponds to the generic SQL data type. The property "name" corresponds to the internal data type name for a specific domain. The value of name is a database-specific data type name for a SQL <data type>. The property "defaultValue" is set to indicate a default value for the member type. The property "jdbcEnumType" is set based on a mapping to jdbc using the jdbc types per java.sql.Types. By way of background, JDBC (Java Database Connectivity) is an application program interface (API) specification for connecting programs written in Java to the data in popular databases.

Generally, the JDBC API allows for an interface between a Java program with a requirement to access a relational database and the relational database for which access is required. By including the property "jdbcEnumType" in the abstract class RDBMemberType 204, a database with a meta data store that follows the schema of the present invention may be accessed by a Java program in a standard manner.

The method getCopy( ) is used to construct an object that is an instantiation of a subclass of the abstract class RDBMemberType 204, set the originatingType to the type of the original object and return a new object of the newly constructed type.

Figure 3:
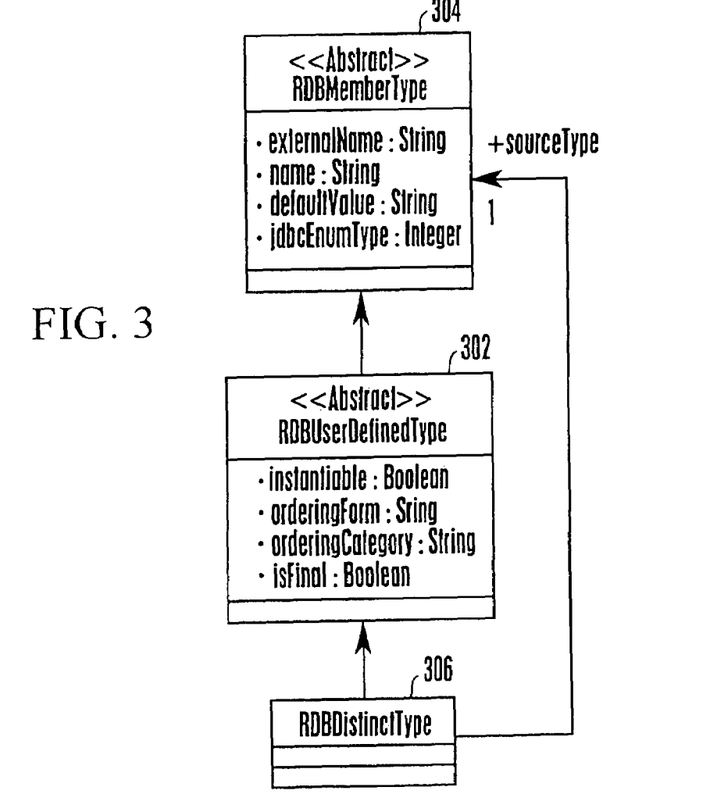
FIG. 3 illustrates a class diagram, of the UML schema that is an embodiment of the present invention, including an abstract class RDBUserDefinedType.

FIG. 3 shows an abstract class RDBUserDefinedType 302. A user defined type is made of members and methods (also known as attributes and operations). Each user defined type provides a name scope (i.e., a domain in which each member name should be unique) to each of these members and methods. Operations have name parameters that are also in a name scope.

As shown in FIG. 3, the abstract class RDBUserDefinedType 302 is derived from an abstract class RDBMemberType 204 and includes two boolean properties, called "instantiable" and "isFinal", and two string properties, called "orderingForm" and "orderingCategory".

The property "instantiable" is used to indicate whether or not an object may be instantiated from a class derived from the abstract class RDBUserDefinedType 302 (i.e., whether the class derived from the abstract class RDBUserDefinedType 302 is also an abstract class). The property "instantiable" should have an initial value of true. The property "isFinal" is for indicating whether a class derived from the abstract class RDBUserDefinedType 302 is final. A class is final when the class cannot be subclassed (i.e., extended). The initial value of the property "isFinal" should be false. The properties called orderingForm orderingCategory correspond directly to properties of User Defined Types defined in the SQL specification.

A class RDBDistinctType 306 is derived from the abstract class RDBUserDefinedType 302 and references the abstract class RDBMemberType 204. Note that objects of the class RDBDistinctType 306 will exist in an object-oriented meta data store of database types, while objects of the abstract class RDBUserDefinedType 302 and the abstract class RDBMemberType 304 will not exist.

Figure 4:
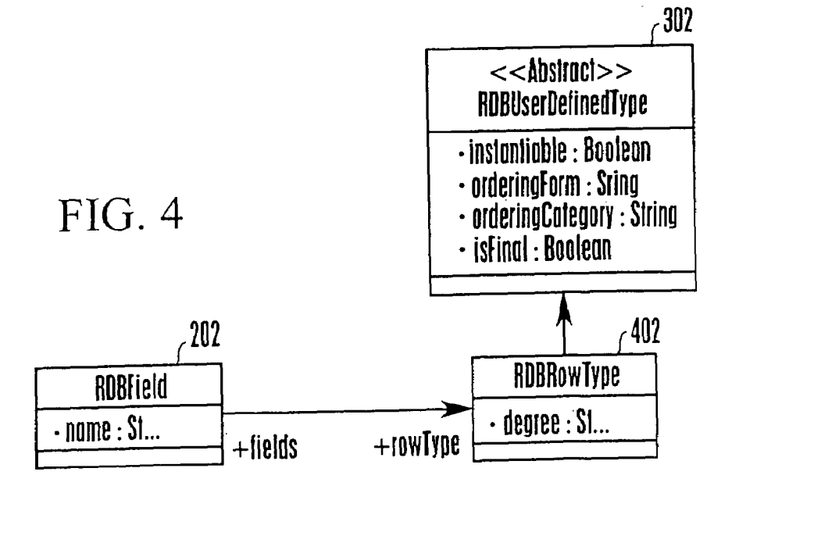
FIG. 4 illustrates a class diagram, of the UML schema that is an embodiment of the present invention, including a class RDBRowType.

As shown in FIG. 4, a class RDBRowType 402, which owns the class RDBField 202, is derived from the abstract class RDBUserDefinedType 302 and includes a string property called "degree".

Figure 5:
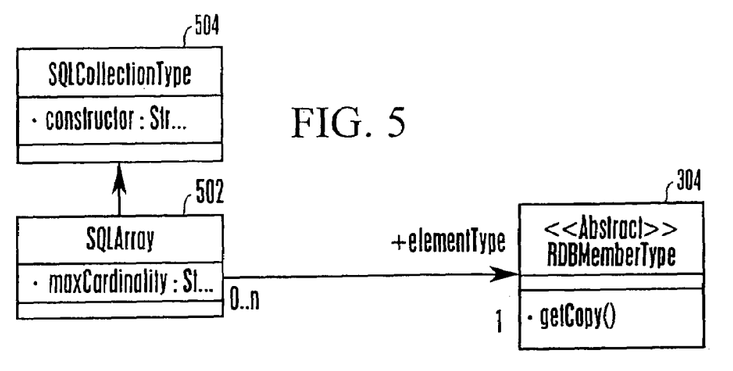
FIG. 5 illustrates a class diagram, of the UML schema that is an embodiment of the present invention, including a class SQLArray.

An array is a collection in which each element is associated with exactly one ordinal position in the collection. As shown in FIG. 5, a class SQLCollectionType 504 includes a string property called "constructor" and a class SQLArray 502 is derived from the class SQLCollectionType 504, references the abstract class RDBMemberType 304 and includes a string property "maxCardinality".

Figure 6:
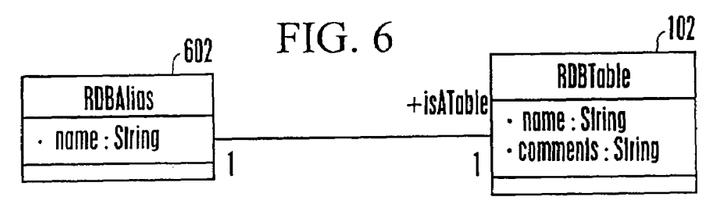
FIG. 6 illustrates a class diagram, of the UML schema that is an embodiment of the present invention, including a class RDBAlias.

As shown in FIG. 6, a class RDBAlias 602 references the class RDBTable 102 and includes a string property called "name".

Figure 7:
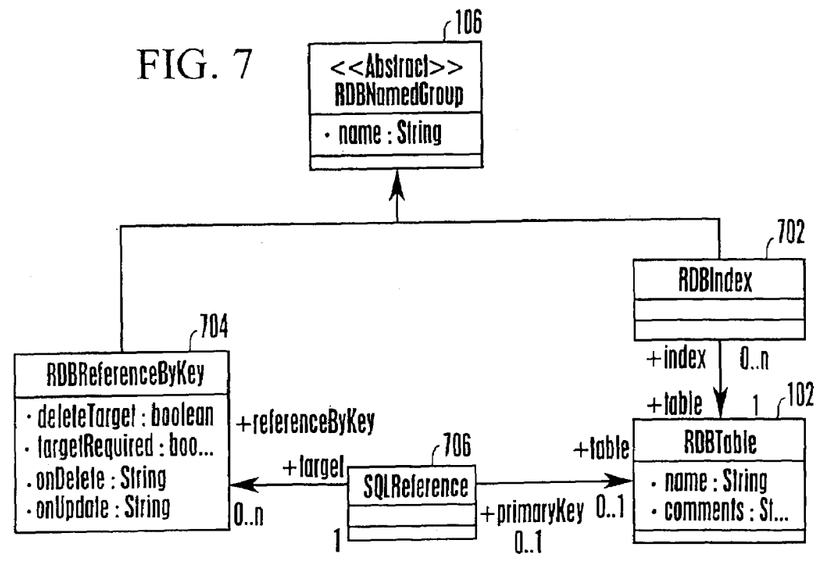
FIG. 7 illustrates a class diagram, of the UML schema that is an embodiment of the present invention, including a class RDBReferenceByKey.

FIG. 7 shows a class RDBReferenceByKey 704. The definition of ReferenceByKey is based on the foreign key concept. It is the source of the relationship and has a name. It has a reference to the named group that is the target of the reference. An example is that the ReferenceByKey points to the set of columns that contain the values that can be used to reference the primary keys of a target table. Note that the target need not be a primary key, the target could simply be a named set of columns that make up an index.

As shown in FIG. 7, a class RDBIndex 702 is derived from the abstract class RDBNamedGroup 106 and is referenced by the class RDBTable 102. A class SQLReference 706 is also derived from the abstract class RDBNamedGroup 106 and is also referenced by the class RDBTable 102. The class RDBReferenceByKey 704 is derived from the abstract class RDBNamedGroup 106 and references the class SQLReference 706. The class RDBReferenceByKey 704 includes two Boolean properties called, respectively, "deleteTarget" and "targetRequired" and two string-type properties called, respectively, "onDelete" and "onUpdate".

Figure 8:
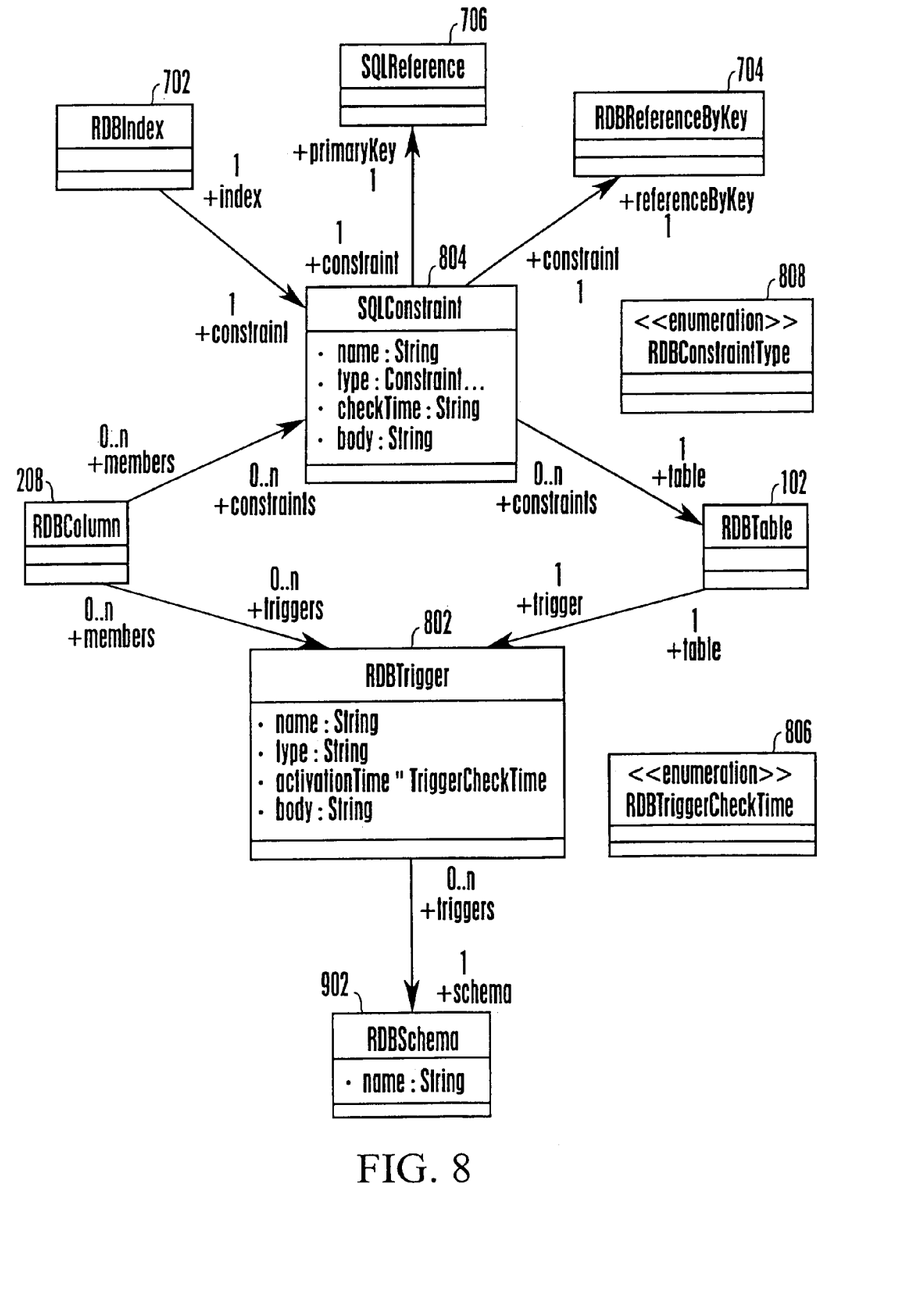
FIG. 8 illustrates a class diagram, of the UML schema that is an embodiment of the present invention, including a class SQLConstraint.

FIG. 8 shows a class SQLConstraint 804. A constraint is a restriction specified on data in a database. There are the following four types of constraints modeled: Primary Key constraints; Foreign Key constraints; Unique constraints; and Check constraints. Primary Keys (SQLReference) and foreign keys (ReferenceByKey) are instantiated as their specific object and a Constraint object with a reference to it. In the case of a primary key, a foreign key and a unique constraint no body attribute is used.

As shown in FIG. 8, a class RDBTrigger 802 references the class RDBColumn 208 and the class RDBTable 102, is referenced by a class RDBSchema 902, includes three properties of type string, called "name", "type" and "body", and includes a property called "activationTime", which is of type TriggerCheckTime.

The class SQLConstraint 804 references the class RDBIndex 702, and the class RDBColumn 208 while being referenced by the class SQLReference 706 and the class RDBReferenceByKey 704. The class SQLConstraint 804 includes three string-type properties called "name", "checkTime" and "body" and one property called "type" of type ConstraintType. The class RDBTable 102 owns the class SQLConstraint 804.

FIG. 8 also includes two enumerations, namely an enumeration RDBTriggerCheckTime 806 and an enumeration RDBConstraintType 808. As will be apparent to a person skilled in the art, enumerations are predefined possible values for the property they are used to define.

Figure 9:
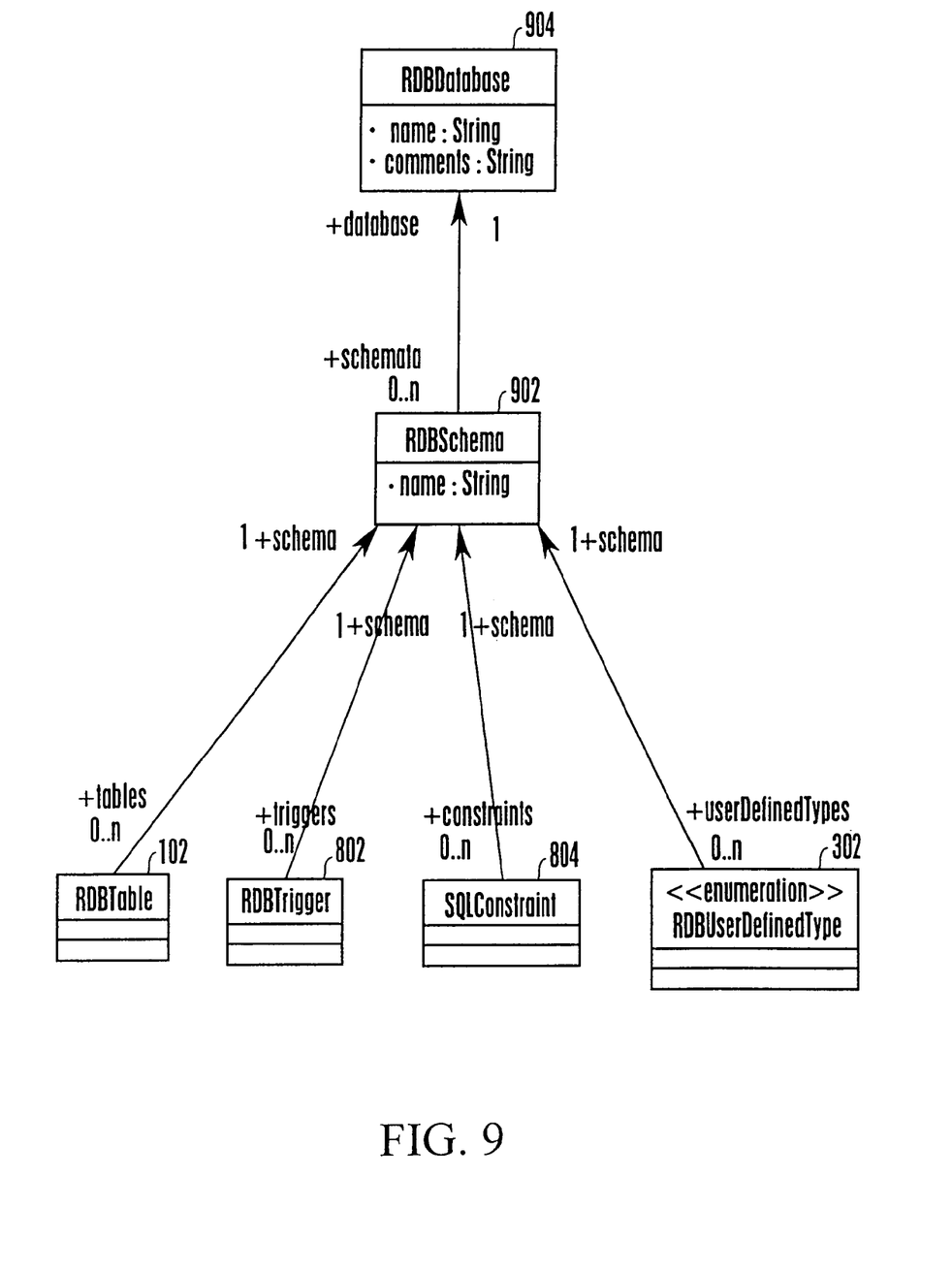
FIG. 9 illustrates a class diagram, of the UML schema that is an embodiment of the present invention, including a class RDBSchema.

As shown in FIG. 9, the class RDBSchema 902 references the class RDBTable 102, the class RDBTrigger 802, the class SQLConstraint 804 and the abstract class RDBUserDefinedType 302. Further, the class RDBSchema 902 is referenced by a class RDBDatabase 904 and includes a string-type property called "name". The class RDBSchema 902 name scopes all table names in a normal qualified name structure (3 part names). The class RDBDatabase 904 includes two string-type properties called, respectively, "name" and "comments".

Figure 10:
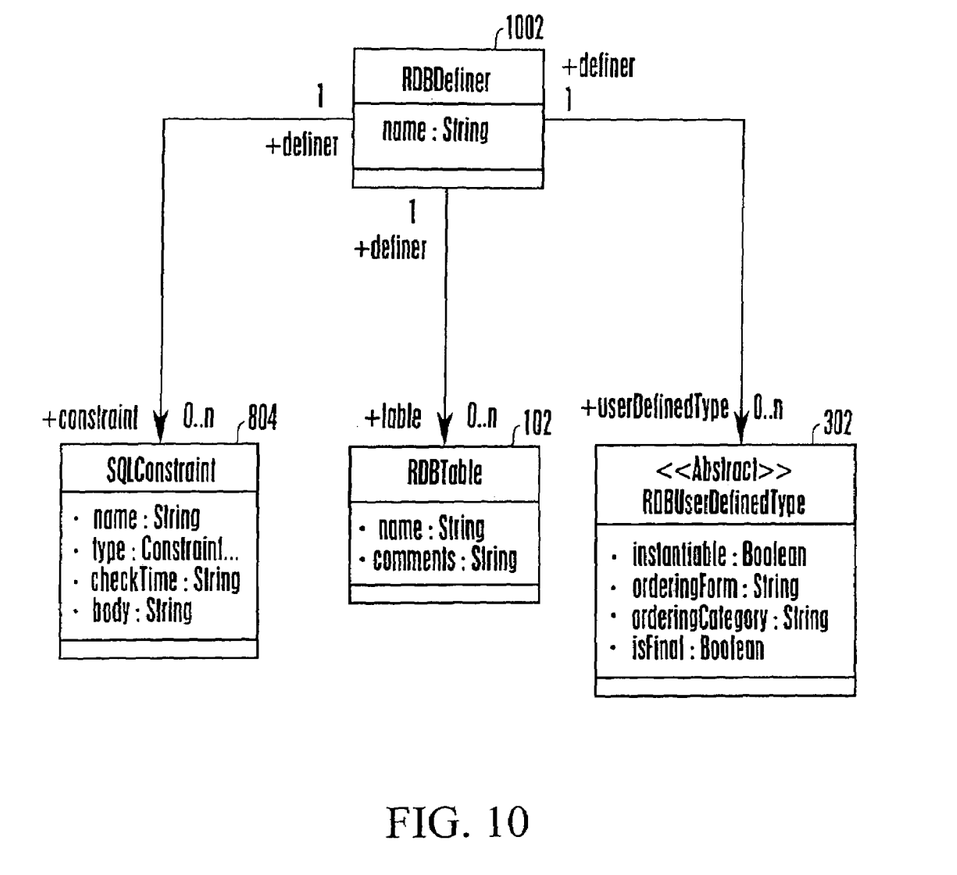
FIG. 10 illustrates a class diagram, of the UML schema that is an embodiment of the present invention, including a class RDBDefiner.

As shown in FIG. 10, a class RDBDefiner 1002 is referenced by the class SQLConstraint 804, the class RDBTable 102 and the abstract class RDBUserDefinedType 302. The definer is the ID of the person that created the schema definitions. Generally, a person logs in to a database creation tool to create a table definition. When reviewing a database definition it may help to know who was responsible for definitions of Tables, Constraints and User Defined Types.

Figure 11:
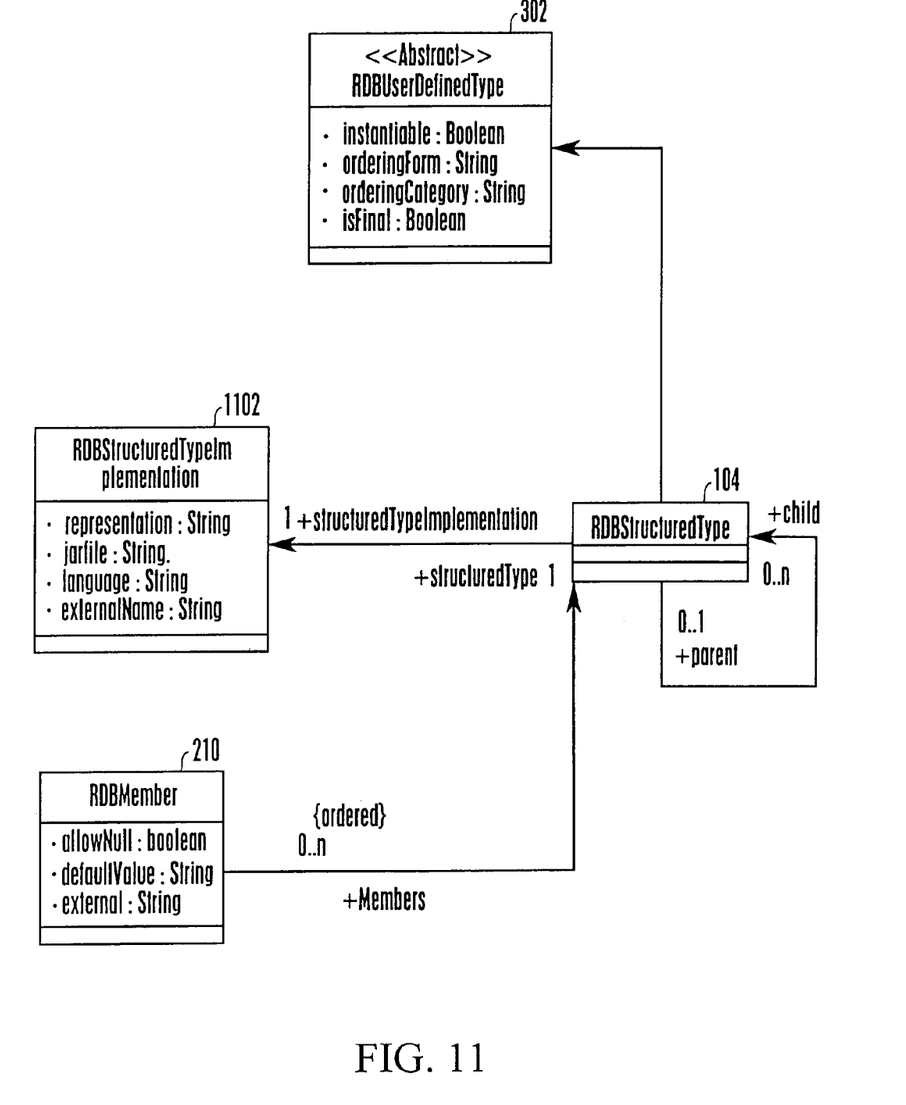
FIG. 11 illustrates a class diagram, of the UML schema that is an embodiment of the present invention, including a class RDBStructuredType.

As shown in FIG. 11, a class RDBStructuredTypeImplementation 1102 references the class RDBStructuredType 104 and includes four string-type properties called, respectively, "representation", "jarfile", "language" and "externalName".

The class RDBStructuredType 104, which owns the class RDBMember 210, is derived from the abstract class RDBUserDefinedType 302. Child objects of the class RDBStructuredType 104 may reference a parent object that is also of the class RDBStructuredType 104.

Figure 12:
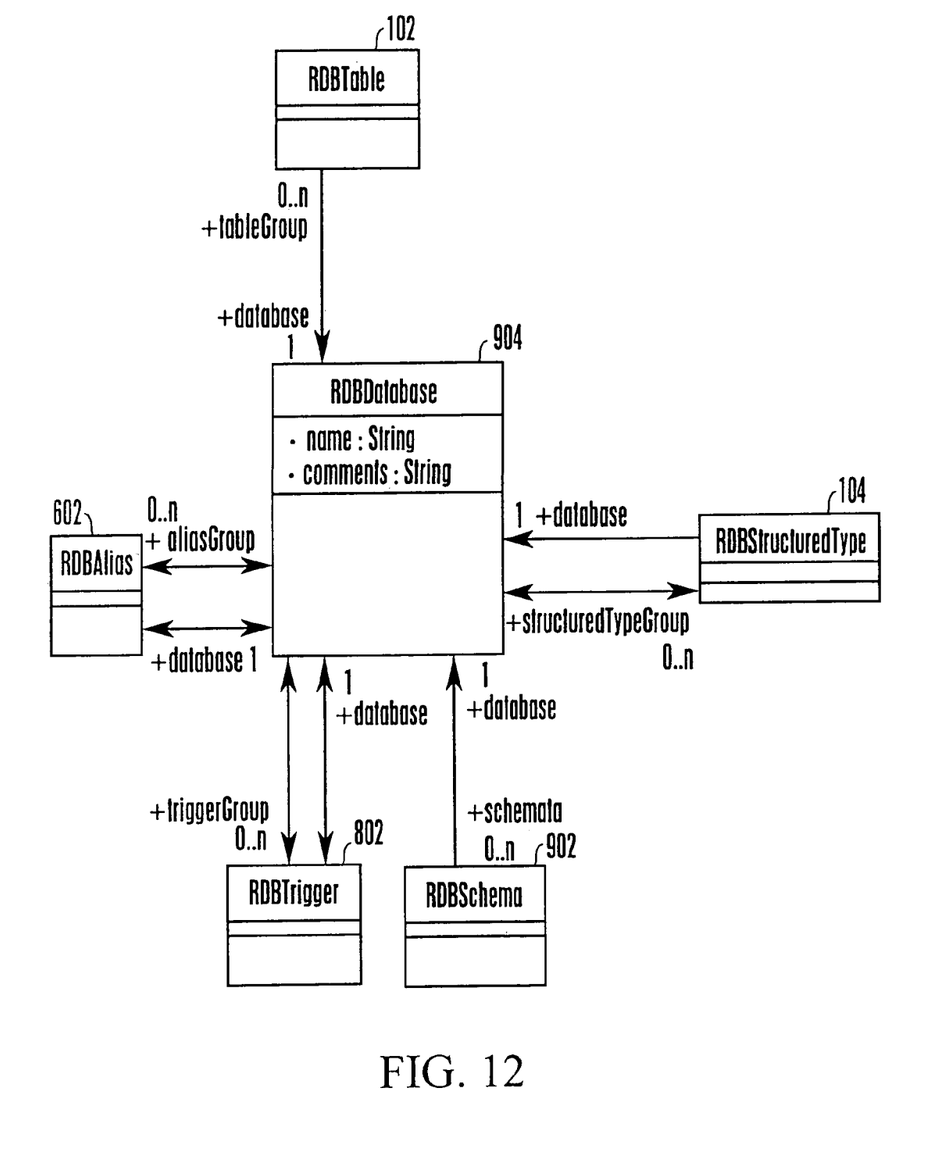
FIG. 12 illustrates a class diagram, of the UML schema that is an embodiment of the present invention, including a class RDBDatabase.

As shown in FIG. 12, the class RDBDatabase 904 references the class RDBTable 102, the class RDBAlias 602, the class RDBTrigger 802, the class RDBSchema 902 and the class RDBStructuredType 104. In addition, the class RDBDatabase 904 is referenced by the class RDBAlias 602, the class RDBTrigger 802 and the class RDBStructuredType 104. Properties of type string that are included in the class RDBDatabase 904 are called "name" and "comments". As will be apparent to a person skilled in the art, all these unidirectional relationships are in place to allow for bi-directional de-serialization by a Meta Object Facility (MOF, described hereinafter). Each of these objects are serialized in a separate file by convention.

In a preferred embodiment, once the present schema is used to describe a database catalog, the meta data may then be serialized in standard XMI format for sharing. The data may be serialized by an MOF/XMI tool kit.

The XML Meta data Interchange (XMI) format is a proposed use of the Extensible Markup Language (XML) that is intended to provide a standard way for programmers and other users to exchange information about meta data (essentially, information about what a set of data consists of and how it is organized). Specifically, the XMI format is intended to help programmers using the UML with different languages and development tools to exchange their data models with each other. In addition, the XMI format can also be used to exchange information about data warehouses. Effectively, the XMI format standardizes how any set of meta data is described and requires users across many industries and operating environments to see data the same way. The XMI format is a proposal from the Object Management Group (OMG) that builds on and extends these industry standards or recommendations: XML; UML; and Meta Object Facility (MOF), which is another standard from the OMG for a metamodeling and meta data repository.

Figure 13:
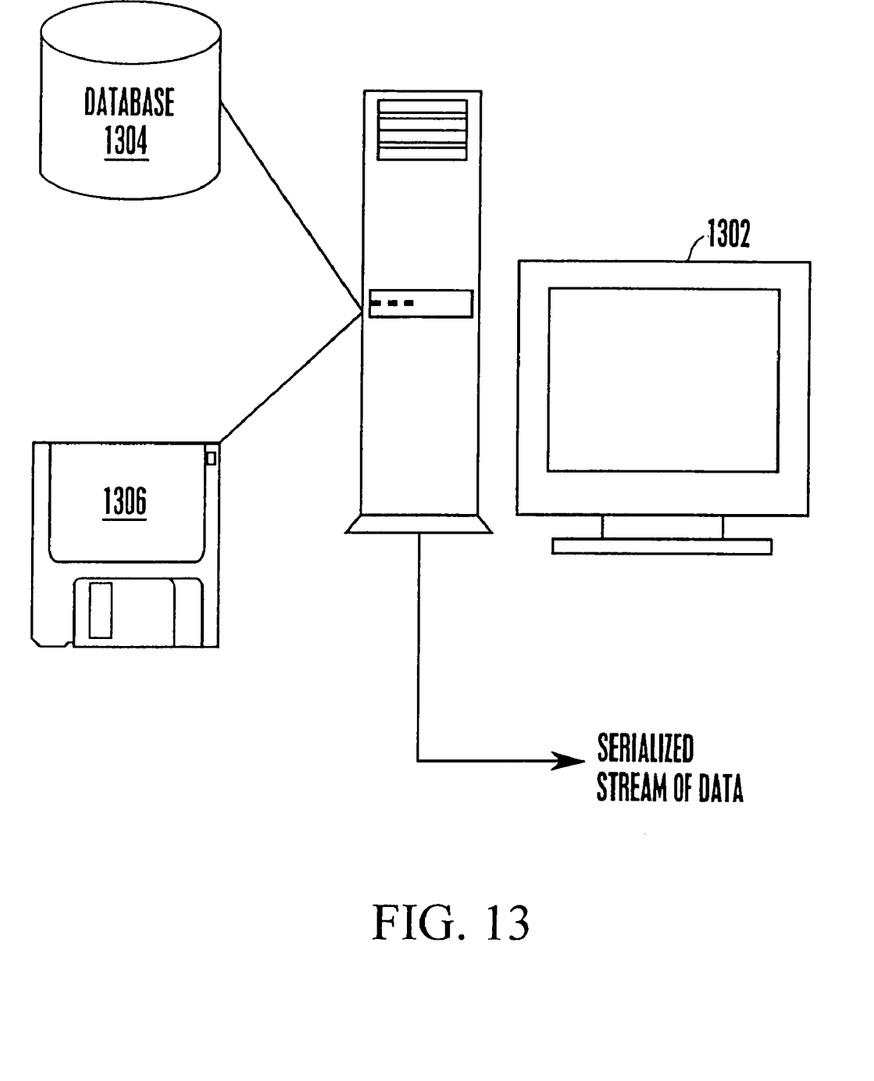
FIG. 13 illustrates a computer system, in communication with a database, for using the UML schema that is an embodiment of the present invention.

As shown in FIG. 13, a computer system 1302 is in communication with a database 1304. The computer system 1302 may be loaded with database tool software for executing methods exemplary of this invention from a software medium 1306 which could be a disk, a tape, a chip or a random access memory containing a file downloaded from a remote source.

In operation, an object-oriented program running on the computer system 1302 may, for instance, read meta data associated with the database 1304 in a database vendor proprietary format. The object-oriented program may then store the meta data to a storage system in the computer system 1302 or elsewhere, while associating the meta data with the database 1304, in a format that is an implementation of the UML schema described hereinbefore. The database 1304, in conjunction with meta data so stored, may then be shared with other computer systems familiar with the schema, without data loss. Alternatively, the computer system 1302, through the actions of the object-oriented program, may output the meta data in a data stream in XMI format, for use by another computer system in accessing the contents of the database 1304.

For example, consider a simple customer database containing a table of customer address information. Columns of the table may include "customer name", "house number", "street name", "apartment number", "city", "province" and "postal code". If the meta data describing this table is to follow the teachings of the present invention, an object of the class RDBTable 102 will own objects of the class RDBColumn 208, each of these objects having a "name" property (see FIGS. 1 and 2). It may be advantageous to group certain of these column objects, say "house number", "street name" and "apartment number" into a group named "street address" that is reflected in the properties of each of the objects in the group. An object of a class, such as the class RDBIndex 702, that is derived from the abstract class RDBNamedGroup 106 may have StreetAddress as a value for the property "name".

An alternative design that happens to exploit more aspects of the present invention would have the possible following structure. A customer database called Cust01 would be described by creating an object of the class RDBDatabase 904 with a "name" property of Cust01 and a "description" property of customer database for region 1. The database would also have a Schema called CustApp which may be represented by an object of the class RDBSchema 902 that has a "name" property with the value CustApp. There could also be an object of the class RDBRowType 402, with a "name" property Location, that has fields with the following names: HouseNumber, StreetName, AptNumber, City, Province, PostalCode. Finally, there would be an object of the class RDBTable 102, with a "name" property of Customer, that is defined by an object of the class RDBStructuredType 104. The RDBTable object would be further defined to have an object of the class RDBMember 210, with a "name" property of Address, that is defined by the RDBRowType object named Location, and two objects of the class RDBColumn 208 having "name" properties of Name and SocialSecNum, respectively.

This example provides basically the same capability to store customer information as the simpler example above, but has some better design features that allow for the reuse of the RDBRowType object named Location.

Once the meta data describing this simple database is stored in a manner that conforms to the schema of the present invention, the simple database may be opened using a tool that understands the schema of the present invention. Once the simple database has been opened, the user of the tool may access the database in a conventional manner. For instance, the user of the tool may query the simple database for address information on a particular customer. Alternatively, the simple database may be queried to learn the number of customers resident in a particular geographic area, say through the use of such a constraint as postal code.

Not only can the tool, or the user of the tool, query the database, the tool, or the user of the tool, can also see the structure of the database including such information as the table names, the table types, the column names and the column types. This information may then be used to build application code, for an application that will access the database. Alternatively, the structure information may be used directly to form a new query.

A user could, for instance, examine the various tables and columns by name and relation to one another. If the user wishes to query the simple customer database mentioned above with age as a constraint, it will be helpful for the user to know how the age information is stored in the database. There may simply be a column named "age" or there may be three columns names "day of birth", "month of birth" and "year of birth". In the latter case, the user may then decide on the degree of precision required for an age query.

As will be appreciated by those skilled in the art, modifications to the above-described embodiment can be made without departing from the essence of the invention. For example, a schema for sharing relational database types is expressed above in the form of a Unified Modeling Language (UML) schema, but need not necessarily be expressed in the UML. Other notations, such as the Rumbaugh Object Modeling Technique or Booch notation, may be used to express the schema.

Other modifications will be apparent to those skilled in the art and, therefore, the invention is defined in the claims.

The embodiments of the invention in which an exclusive property or privilege is claimed are defined as follows:

1. A computer implementing a schema for storing, on a computer readable storage medium, meta data that describes at least one relational database in a plurality of databases comprising:
    at least one abstract class for defining at least one data type of at least one member, said abstract class including:
    at least one property for indicating at least one generic Structured Query Language data type for said member; and
    at least one property for indicating at least one database-specific data type name for said member, the database-specific data type name being an internal name for a specific database domain from among the plurality of databases;
    wherein the computer constructs at least one object instantiated from at least one class derived from said abstract class, the object being used by the computer for query execution.

2. The computer of claim 1, wherein said abstract class is a first abstract class, further comprising a second abstract class for describing a user defined data type, said second abstract class derived from said first abstract class, said second abstract class including:
    at least one property for indicating whether an object of at least one class derived from said second abstract class is instantiable; and
    at least one property for indicating whether said class derived from said second abstract class is final.

3. The computer of claim 1 wherein said abstract class further comprises at least one property for indicating at least one default value for said type of said member.

4. The computer of claim 1 wherein the schema includes at least one property for indicating at least one mapping of said database-specific data type name to at least one Java Database Connectivity data type.

5. The computer of claim 1 where said schema is described using the Unified Modeling Language.

6. A computer using a database catalog for data retrieval, the computer accessing a computer readable storage medium containing
    at least one object of at least one class derived from at least one abstract class for defining at least one data type of at least one member, said abstract class including:
    at least one property for indicating at least one generic Structured Query Language data type for said member;
    at least one property for indicating at least one database-specific data type name for said member, the database-specific data type name being an internal name for a specific database domain from among a plurality of databases; and
    the computer constructing at least one object instantiated from at least one class derived from said abstract class.

7. A computer readable medium holding a database catalog with meta data stored in at least one storage system that is an implementation of the schema of claim 1.

8. A computer readable medium holding a tool for creating and editing databases including means for storing meta data in a storage system that is an implementation of the schema of claim 1.

9. A computer readable medium holding a program for creating at least one database comprising storing meta data relating to the database in at least one meta data store according to the schema of claim 1.

10. A computer executing an object-oriented description of at least one relational database in a plurality of databases comprising:
- at least one object for describing at least one type of at least one member in said relational database, said object instantiated from at least one class derived from at least one abstract class for defining at least one data type of at least one member, said abstract class including:
- at least one property for indicating at least one generic Structured Query Language data type for said member;
- at least one property for indicating at least one database-specific data type name for said member, the database-specific data type name being an internal name for a specific database domain from among the plurality of databases;
- means for constructing at least one object instantiated from at least one class derived from said abstract class.

11. A computer containing at least one object-oriented description of a relational database, said object-oriented description comprising:
- at least one object for describing a type of a member in said relational database, said object instantiated from a class derived from at least one abstract class for defining a data type of a member, said abstract class including:
- a property for indicating a generic Structured Query Language data type for said member;
- a property for indicating a database-specific data type name for said member, the database-specific data type name being an internal name for a specific database domain from among a plurality of databases; and
- logic for constructing at least one object instantiated from a class derived from said abstract class.

12. A computer readable medium storing an object-oriented programming language implementation of a schema for storing meta data that describes a relational database comprising:
- at least one abstract class for defining a data type of a member, said abstract class including:
- a property for indicating a generic Structured Query Language data type for said member;
- a property for indicating a database-specific data type name for said member, the database-specific data type name being an internal name for a specific database domain from among a plurality of databases; and
- the computer constructing at least one object instantiated from a class derived from said abstract class.

* * * * *